United States Patent [19]

Gusmer et al.

[11] E Re. 29,665

[45] Reissued June 13, 1978

[54] APPARATUS FOR EJECTING A MIXTURE OF A PLURALITY OF LIQUIDS

[75] Inventors: Frederick E. Gusmer, Mantoloking, Carl W. Sundberg, Jr., Chatham, both of N.J.; Joseph E. Hayes, Jr., Woodland Park, Colo.

[73] Assignee: Gusmer Corporation, Old Bridge, N.J.

[21] Appl. No.: 771,810

[22] Filed: Feb. 24, 1977

Related U.S. Patent Documents

Reissue of:

[64] Patent No.: 3,876,145
Issued: Apr. 8, 1975
Appl. No.: 435,685
Filed: Jan. 23, 1974

[51] Int. Cl.[2] ..... B05B 15/02

[52] U.S. Cl. ..... 239/112; 239/414; 239/569

[58] Field of Search ..... 239/112, 115–118, 239/113, 379, 414, 415, 527, 528, 569, 2

[56] References Cited

U.S. PATENT DOCUMENTS

| | | | |
|---|---|---|---|
| 3,144,210 | 8/1964 | Levy | 239/415 |
| 3,263,928 | 8/1966 | Gusmer | 239/414 X |
| 3,687,370 | 8/1972 | Sperry | 239/414 X |
| 3,786,990 | 1/1974 | Hagfors | 239/414 X |

*Primary Examiner*—Joseph F. Peters, Jr.
*Assistant Examiner*—Gene A. Church
*Attorney, Agent, or Firm*—Young & Thompson

[57] ABSTRACT

Apparatus for ejecting a mixture of liquids, e.g. urethane foam, comprises a cylindrical chamber into which the liquids are separately introduced under pressure and mixed and ejected from the open end of the chamber. A reciprocable plunger alternately exposes the inlets in its rear portion and seals the inlets from each other and purges the chamber in its forward position. The inlets are axially spaced apart and separated from each other by a throat that has interference fit with the plunger in the forward position of the plunger, the plunger having for this purpose an elastic deformable surface.

18 Claims, 5 Drawing Figures

FIG.1
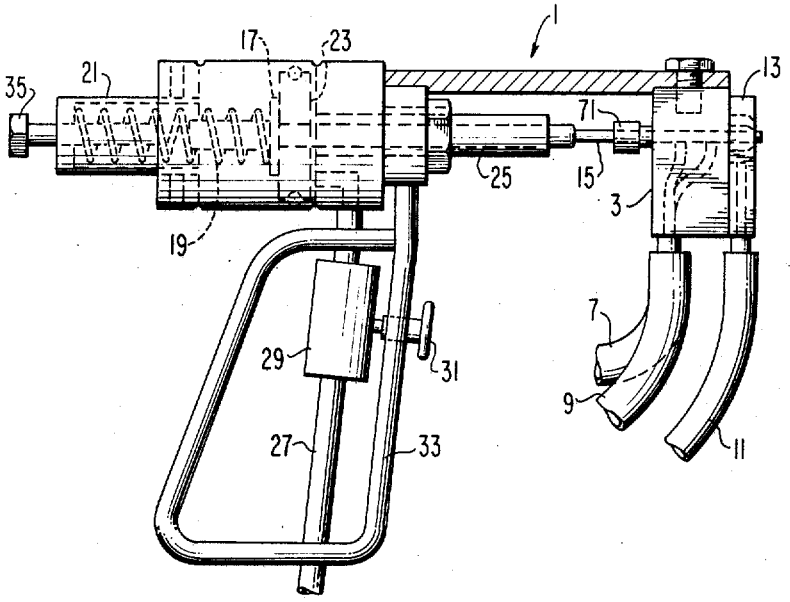
FIG.2
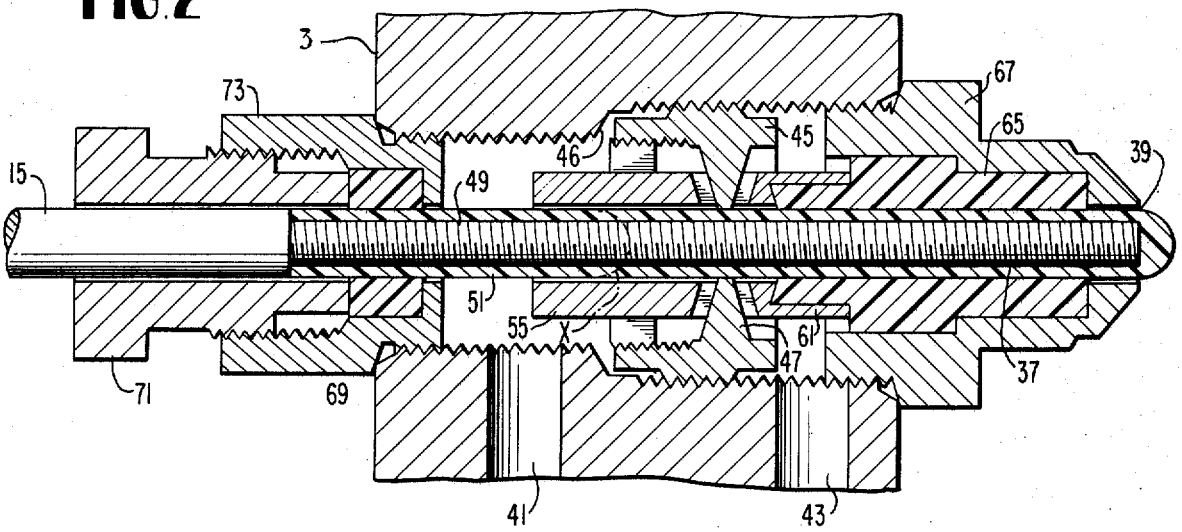
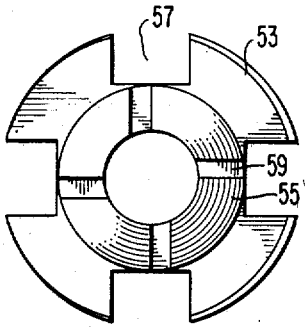
FIG.3
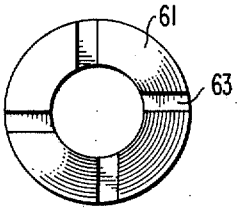
FIG.4
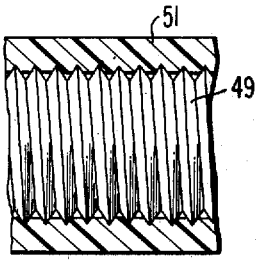
FIG.5

APPARATUS FOR EJECTING A MIXTURE OF A PLURALITY OF LIQUIDS

Matter enclosed in heavy brackets [ ] appears in the original patent but forms no part of this reissue specification; matter printed in italics indicates the additions made by reissue.

The present invention relates to apparatus for ejecting a mixture of liquids, and more particularly to ejecting a homogeneous mixture of liquid which must be mixed as nearly concurrently with ejection as possible. The invention has utility in a number of fields, such as the ejection of foam, of highly exothermic mixtures, and of thermosetting resin formulations. It will be disclosed, by way of example, in connection with the ejection of foam, particularly foam of the urethane type.

For some applications, the present invention will be used to eject mixtures in a divided form such as spray or droplets or larger cohesive units. However, it is to be understood that the present invention is also useful for the ejection of mixed liquids in a continuous stream.

It is also to be understood that although some of the ejection of mixed liquids according to the present invention will be against a solid substrate, it is also within the purview of the present invention to eject mixed liquids into a partially or completely enclosed region such as a chamber. Thus, the present invention is amenable to such applications as spray coating on a solid substrate, caulking by injection of a continuous stream into a joint or seam or the like, the insertion of insulation by the ejection of a continuous or particulate stream into a space to be insulated, the formation of shaped bodies of foamed or unfoamed plastics by ejection of a mixture of liquids into a mold cavity, the formation of unshaped bodies of foamed plastics by ejection of the mixture onto a moving conveyor, packaging such as polyurethane packaging, or other processes which will be obvious to persons having ordinary skill in this art.

The present invention is an improvement on U.S. Pat. No. 3,263,928, Aug. 2, 1966. In the device of that patent, as in other devices in this field, liquids have been mixed and ejected by separately introducing them into a mixing chamber having an open outlet end, from spaced inlets that open into the chamber at about the same distance from the outlet along the axis of the chamber, in a region of the chamber that is swept by a plunger that in its rearward position exposes the inlets and permits the liquids to flow into the chamber and mix in the chamber and be ejected from the open end of the chamber, and upon movement toward its forward position simultaneously closes all the inlets and then sweeps the remaining mixed liquids forwardly out of the chamber.

The aim of such devices is to prevent the retention or accumulation in the chamber of any substantial quantity of the mixture of liquids. These liquids are ordinarily mutually reactive to set up to a solid which would impede operation of the device if not completely purged by the plunger.

It has been found, however, that in practice, the plunger still has a tendency to stick both in the closed and in the open position. It has also been found to be difficult, with the known devices, to maintain good distribution of material across the spray pattern. Finally, there is a tendency in such known devices, for the reactive liquids to seep past the parts of the apparatus in the off position, and to mix and react and impede operation of the device.

Accordingly, it is an object of the present invention to provide apparatus for ejecting a mixture of a plurality of liquids, in which the tendency toward sticking of the plunger in the open and/or closed position is reduced.

Another object of the present invention is the provision of such apparatus, which has good distribution of material across the spray pattern.

Still another object of the present invention is the provision of such apparatus, in which seepage of the liquids in the closed position is eliminated.

Still another object of the present invention is the provision of such apparatus, having improved plunger construction.

Finally, it is an object of the present invention to provide such apparatus, which will be relatively simple and inexpensive to manufacture, easy to operate, maintain and repair, and rugged and durable in use.

Other objects, features and advantages of the present invention will become apparent from a consideration of the following description, taken in connection with the accompanying drawing, in which:

FIG. 1 is a side elevational view of apparatus according to the present invention;

FIG. 2 is an enlarged cross-sectional view of the valve and ejector outlet assembly of the present invention;

FIG. 3 is an end view of the rear impinger viewed from the right in FIG. 2;

FIG. 4 is an end view of the front impinger viewed from the left in FIG. 2; and FIG. 5 is an enlarged fragmentary cross-sectional view of the plunger.

Referring now to the drawing in greater detail, there is shown a gun according to the invention, indicated generally at 1, and including a head 3. Conduits 7 and 9 each supplies a different liquid to head 3. Sources of supply for these different liquids under pressure to conduits 7 and 9 are not shown but may take any usual form. An air hose 11 supplies compressed air to an air cap 13. Air cap 13 directs air against and along the exterior of valve nozzle 67 for the purpose of cleaning the front end of the apparatus. For this purpose, compressed air can be used at a relatively low gauge pressure, for example, about 1 to 10 p.s.i.g. In this way, the accumulation of deposits of reactive material about the outlet of the spray equipment is avoided. This compressed air is not intended to assist in atomizing when spraying.

A plunger 15 is reciprocable in head 3. The plunger 15 adjacent its forward or free end is of cylindrical contour and of uniform external diameter. Adjacent its rear end, plunger 15 carries an adjustment nut 17 screw-threadedly thereon. A coil compression spring 19 bears between adjustment nut 17 and the rear end of a housing 21 carried by the gun and continuously urges plunger 15 forwardly. A piston 23 is slidable in a cylinder formed in the rear of the gun. A hollow tubular sleeve 25 extends forwardly from piston 23 and encompasses plunger 15 to guide and support plunger 15 and also to guide piston 23.

An air hose 27 under the control of valve 29 brings compressed air to the forward side of piston 23 to force piston 23 rearwardly against adjustment nut 17 and to force adjustment nut 17 and with it plunger 15 rearwardly against the action of spring 19. Valve 29 is selectively opened and closed by actuation of an actuating button 31 carried by the handle 33 of the gun. Depressing button 31 opens valve 29 to admit compressed air 27 to the chamber forwardly of piston 23, to drive the piston rearwardly until the rear end of plunger 15 contacts an adjustable plunger stop 35 screw-threadedly received in the rear of housing 21 and rotatably adjustable to advance or retract its forward end thereby to fix the rearmost position of plunger 15. The forwardmost position of plunger 15 is set by manipulation of adjustment nut 17.

The forward end of plunger 15 is disposed in a mixing chamber 37 within head 3. Mixing chamber 37 has an outlet end 39 and is of substantially uniform cross-sectional configuration from end to end thereof, including outlet end 39. In general, it is preferred that mixing chamber 37 and outlet end 39 thereof have a substantially uniformly cylindrical shape.

Thus far, the arrangement of the present invention can be generally as in the above-identified patent. The particular novelty of the present invention is as follows:

Remembering that in the prior art, the inlets for the different liquids are generally opposed to each other, in the present invention, the inlets of the different liquids, shown at 41 and 43 in FIG. 2, are axially spaced apart lengthwise of the chamber 37, and are separated from each other by the plunger 15 in the closed position. In the open position, however, when the plunger is withdrawn to the position indicated for example at x in FIG. 2, then the inlets 41 and 43 both communicate with the mixing chamber and the different liquids can enter and mix therein and exit through the outlet end 39.

An annular throat 45 is externally screw threadedly secured in head 3 and can be rotated into sealingly seated engagement against a conical shoulder 46 in head 3 and has a radially inwardly extending annular projection 47 thereon of generally truncated conical cross-sectional configuration that terminates inwardly in a radially innermost surface of throat 45 which has an interference fit with plunger 15. That is, the inner diameter of throat 45 is less than the normal outer diameter of plunger 15. To accommodate this interference fit, the forward end of plunger 15 is comprised by an externally screw threaded metal rod 49 that is surrounded by a sleeve 51 of elastic deformable material having a low coefficient of sliding friction, preferably an elastomer and more preferably an organic elastomer, for example solid polyamide, e.g. nylon. The outer diameter of the screw threads on rod 49 is greater than the inner diameter of sleeve 51, so that sleeve 51 in turn has an interference fit with rod 49. For example, if sleeve 51 were one-eighth-inch outside diameter nylon tubing with a wall 0.020 inch thick, then the threads of rod 49 could have an outside diameter of 0.090 inch, so that they are greater in diameter than the inside diameter of sleeve 51 by 0.005 inch. Similarly, the inside diameter of throat 45 may for example be 0.0025 inch, $\pm$ 0.0005 inch, smaller than the outside diameter of sleeve 51.

The interference fit between throat 45 and sleeve 51 prevents seepage of liquid past throat 45 in the closed position shown in full line in FIG. 2, and also provides a sweeping or cleaning action of the throat relative to the plunger in both directions of movement of the plunger. The interference fit between sleeve 51 and threaded rod 49, on the other hand, assures retention of sleeve 51 on rod 49; and as the material of sleeve 51 does not entirely fill up the grooves between the threads on rod 49, as seen in FIG. 5, these unfilled spaces permit displacement of the material of sleeve 51 radially inwardly as the sleeve passes through throat 45. Thus the interference fit between throat 45 and sleeve 51 does not cause a wave or lump of material of sleeve 51 to move axially along plunger 15. In this way, the arrangement shown in FIG. 5 performs the unique dual function of properly retaining sleeve 51 on the plunger, and also of permitting radially inward deformation of sleeve 51 while passing through throat 45.

Throat 45 is internally screw threaded to receive and retain the radially outwardly extending flange 53 of a rear impinger 55 through which plunger 15 passes. Flange 53 is slotted at 57 to permit liquid from inlet 41 to pass through slots 57, and then through smaller slots 59 to mixing chamber 37. The forward end of impinger 55 is conical and of the same shape as the adjacent face of throat 45, so that the adjacent conical face of throat 45 closes the forward sides of slots 59. Slots 59 are forwardly inclined at an angle of about 20° and are axially offset as seen in FIG. 3 to produce a desirable vortical movement in chamber 37 to promote mixing.

On the other side of throat 45, a front impinger 61 is provided, with a conical rear end traversed by slots 63 to provide communication for the other liquid from inlet 43 through slots 63 to mixing chamber 37. The rear end of front impinger 61, which is the left end as seen in FIG. 2, is conical and of the same shape as the adjacent face of throat 45 and so that face of throat 45 closes the rear side of slots 63. Slots 63 are rearwardly inclined at an angle of about 20° and are axially offset as seen in FIG. 4, to promote a desirable vortical motion for mixing purposes.

The provision of impingers 55 and 61 that bear against opposite sides of throat 45 and that have slots cut in their ends adjacent throat 45 with throat 45 closing the slots, greatly facilitates the provision of openings for the passage of the liquids into the reaction chamber, because it is much easier to machine slots in the ends of the impingers, than it would be to provide accurate holes through a cylindrical sleeve.

The axial spacing of slots 59 and 63 makes it possible to increase the total number of the slots, and this has several beneficial results. In the first place, increasing the number of slots and spacing them apart axially improves the dispersion of the liquid as it leaves the gun and thus helps to distribute the liquid better within the spray pattern. In the second place, increasing the number of slots decreases the cross section of each slot and hence the cross section of the streams prior to mixing and so facilitates the fine division and mixing of the streams.

Front impinger 61 is secured to a packing sleeve of elastic deformable material having a low coefficient of sliding friction, preferably an elastomer and more preferably an organic elastomer, such as polytetrafluoroethylene. The rear end of sleeve 65, in turn, is loosely disposed in nozzle 67 that is screw threadedly secured in head 3, so that front impinger 61 and the rear end of packing sleeve 65 float together as a unit relative to nozzle 67, with the result that the front end assembly is self-aligning and the problem of maintaining extremely small manufacturing tolerances is thereby avoided. The front end of packing sleeve 65 seals in nozzle 67.

To the rear of the mixing chamber, the assembly is completed by a packing sleeve 69 of a material such as that of sleeve 65, which may be tightened with a packing adjustment screw 71 screw threadedly received in a sleeve 73 which in turn is screw threadedly received in head 3.

In operation, the user of the gun can actuate the device by depressing button 31, thereby opening valve 29 and causing piston 23 to move to the rear until the rear end of plunger 15 contacts plunger stop 35. In this position, the forward or free end of plunger 15 moves to the rear of slots 59 and 63, to the position x in FIG. 2, and the different liquids that are supplied under pressure to conduits 7 and 9 rush into mixing chamber 37, where they are given a rotary or swirling movement with resultant shearing and mixing of the streams, by virtue of the offset of slots 59 from each other, and the offset of slots 63 from each other. The mixing liquids thus move toward and out of outlet end 39 with a largely helical movement. The high kinetic energy of the stream may cause the stream to subdivide into discrete particles or drops, or not, depending on process variables well known to persons in this field. Among these variables is the degree of offset of the slots from the axis of chamber 37.

When the operator releases button 31, compressed air to the forward side of piston 23 is cut off and spring 19 forces piston 23 forwardly until the piston contacts the front of its piston chamber. In this position, which is the position of the parts shown in FIG. 2, the forward or free end of piston 15 occupies substantially all of outlet end 39 and preferably protrudes somewhat out of outlet end 39. By this forward movement of plunger 15, substantially all of the mixed liquid within chamber 37 is mechanically expelled. If the liquid is of the type that sets up into a relatively hard substance a short time after mixing, then the advantages of the present invention will be obvious in that substantially no mixed liquid will be left in chamber 37 to harden. On the other hand, the gun will be ready for use again and can begin to function immediately upon a further retraction of plunger 15. It is thus unnecessary to clean the gun after every actuation, as substantially no mixed liquids remain in the gun.

The advantage of the operation of the present invention, with its axially spaced inlets, as compared to the known arrangements with axially opposed inlets for the different liquids, is as follows.

In the closed position, the interference fit of throat 45 prevents any movement of any liquid past the throat along plunger 15, and so effectively isolates the reactive liquids from each other. Moreover, in the closed position, it is impossible for any mixed liquids to move toward the rear packing, because this space is already occupied by the liquid from inlet 41. Thus the rear packing is bathed in liquid from inlet 41, which serves as an additional seal against liquid from inlet 43.

Even in the open position of the parts, the rear packing is protected from contact by any mixed liquid. This is because the slots 59 and 63 serve as restrictive orifices, which let down the pressure of the liquids from inlets 41 and 43, respectively. For example, if the pressure in both inlets 41 and 43 were, say, 800 psi, and the reduced pressure in chamber 37, by virtue of the pressure loss due to passage through the slots, were, say, 300 psi, then it is obvious that the mixed liquid at 300 psi could not migrate rearward into and contaminate the unmixed liquid from inlet 41 at 800 psi.

Moreover, even plunger 15 cannot carry backward or forward any liquid on its surface, and thus promote even a small degree of undesired mixture of liquids, because the interference fit between plunger 15 and throat 45 wipes plunger 15 clean in both directions of movement.

It is also to be noted that the forward liquid, that is, the liquid that enters through inlet 43, is the first to enter the chamber 37 upon rearward movement of plunger 15 and the last to leave the chamber upon forward movement of plunger 15, that is, the slots 63 are exposed before slots 59 and are closed after slots 59. As a result, there may be a slight excess of this forward liquid at the beginning and end of ejection. However, this is not necessarily undesirable and can in fact even be highly desirable. It is not necessarily undesirable, because if for example the mixture of liquids forms a polyurethane and the rear liquid through inlet 41 is the resinous component and the forward liquid through inlet 43 is its activator containing isocyanate, then this slight excess of isocyanate may itself react with ambient moisture even in the absence of resin admixed therewith. On the other hand, the fact that slots 63 are closed later than slots 59 may be highly desirable, as it ensures that plunger 15 in its closed position, to the extent that it is wetted at all, will be wetted with the single liquid from inlet 43, rather than with the reactive mixture that previously filled chamber 37.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention as those skilled in this art will readily understand. Such modifications and variations are considered to be within the purview and scope of the present invention as defined by the appended claims.

Having described our invention, we claim:

1. Apparatus for ejecting a mixture of a plurality of liquids, comprising a mixing chamber having an outlet opening and a plurality of spaced inlets which are spaced different distances from said outlet opening, means for separately introducing different liquids into the chamber through said inlets, a plunger reciprocable in the chamber between forward and rear positions, the differently spaced inlets communicating with the chamber and with each other in said rear position of the plunger, and means sealing against the plunger in the forward position of the plunger to seal said inlets from each other, the forward end of the plunger being forward of all said inlets in said forward position of the plunger and being rearward of all said inlets in said rear position of the plunger, *the surface of one of said plunger and sealing means being an elastic deformable material, said sealing means comprising an annular throat in which said plunger reciprocates with an interference fit, said plunger being in sealing contact with said throat in said forward position and exposing all said inlets to each other in said rear position, said forward end of said plunger being disposed on opposite sides of said throat in said forward and rear positions, said inlets being disposed on opposite sides of said throat.*

[2. Apparatus as claimed in claim 1, in which the surface of one of said plunger and sealing means is an elastic deformable material.]

3. Apparatus as claimed in claim [2] *1*, in which the surface of said plunger is an elastic deformable material.

[4. Apparatus as claimed in claim 1, said sealing means comprising an annular throat in which said plunger reciprocates with an interference, said plunger being in sealing contact with said throat in said forward position and exposing all said inlets to each other in said rear position, said forward end of said plunger being disposed on opposite sides of said throat in said forward and rear positions, said inlets being disposed on opposite sides of said throat.]

5. Apparatus as claimed in claim [4] *1*, said inlets extending through slots formed in the ends of separable members that abut said throat on opposite sides of said throat, said throat closing one side of each of said slots.

6. Apparatus as claimed in claim 5, said opposite sides of said throat converging radially inwardly.

7. Apparatus as claimed in claim 6, said slots on opposite sides of said throat converging radially inwardly.

8. Apparatus for ejecting a mixture of a plurality of liquids, comprising a mixing chamber having an outlet opening and a plurality of spaced inlets which are spaced different distances from said outlet opening, means for separately introducing different liquids into the chamber through said inlets, a plunger reciprocable in the chamber between forward and rear positions, the differently spaced inlets communicating with the chamber and with each other in said rear position of the plunger, and means sealing against the plunger in the forward position of the plunger to seal said inlets from each other, said plunger adjacent said sealing means comprising a sleeve of elastic deformable material on a metal rod, *said rod having grooves on its outer surface which are only partially filled by the material of said sleeve.*

[9. Apparatus as claimed in claim 8, said rod having grooves on its outer surface which are only partially filled by the material of said sleeve.]

10. Apparatus for ejecting a mixture of a plurality of liquids, comprising a mixing chamber having an outlet opening and a plurality of spaced inlets which are spaced different distances from said outlet opening, means for separately introducing different liquids into the chamber through said inlets, a plunger reciprocable in the chamber between forward and rear positions, the differently spaced inlets communicating with the chamber and with each other in said rear position of the plunger, and means sealing against the plunger in the forward position of the plunger to seal said inlets from each other, said sealing means comprising an annular throat in which said plunger reciprocates with an interference fit, said plunger being in sealing contact with said throat in said forward position and exposing all said inlets to each other in said rear position, said forward end of said plunger being disposed on opposite sides of said throat in said forward and rear positions, said inlets being disposed on opposite sides of said throat, said inlets extending through slots formed in the ends of separable members that abut said throat on opposite sides of said throat, said throat closing one side of each of said slots, said separable member on the same side of said throat as said outlet opening being carried by a floating packing sleeve through which said plunger extends in said forward position.

[11. Apparatus for ejecting a mixture of a plurality of liquids, comprising a mixing chamber having an outlet opening and a plurality of spaced inlets which are spaced different distances from said outlet opening, means for separately introducing different liquids into the chamber through said inlets, a plunger reciprocable in the chamber between forward and rear positions, the differently spaced inlets communicating with the chamber and with each other in said rear position of the plunger, and means sealing against the plunger in the forward position of the plunger to seal said inlets from each other, there being a plurality of said inlets for each said liquid, all the inlets for one said liquid being equally peripherally spaced about said chamber and being the same distance from said outlet opening.]

[12. Apparatus as claimed in claim 11, all said inlets for each said liquid being offset the same distance and in the same direction from the axis of the chamber.]

13. Apparatus for ejecting a mixture of a plurality of liquids, comprising a mixing chamber having an outlet opening and a plurality of spaced inlets which are spaced different distances from said outlet opening, means for separately introducing different liquids into the chamber through said inlets, a plunger reciprocable in the chamber between forward and rear positions, the differently spaced inlets communicating with the chamber and with each other in said rear position of the plunger, and means sealing against the plunger in the forward position of the plunger to seal said inlets from each other, said inlets farthest from said outlet opening being inclined forwardly and said inlets nearest said outlet opening being inclined rearwardly.

*14. Apparatus as claimed in claim 1, said inlets being defined between said throat and separable members on opposite sides of said throat, the inside diameter of said separable members being greater than the inside diameter of said throat.*

*15. Apparatus as claimed in claim 1, said plunger adjacent said sealing means comprising a sleeve of elastic deformable material on a rod, said rod having grooves on its outer surface which are only partially filled by the material of said sleeve.*

*16. Apparatus as claimed in claim 10, said inlets farthest from said outlet opening being inclined forwardly and said inlets nearest said outlet opening being inclined rearwardly, said separable members both having conical surfaces in contact with said throat.*

*17. Apparatus as claimed in claim 13, said sealing means comprising an annular throat in which said plunger reciprocates, said plunger being in sealing contact with said throat in said forward position and exposing all said inlets to each other in said rear position, said forward end of said plunger being disposed on opposite sides of said throat in said forward and rear positions, said inlets being disposed on opposite sides of said throat, said inlets being defined between separable members that abut said throat on opposite sides of said throat, said throat closing one side of each of said inlets, said separable members both having conical surfaces in contact with said throat.*

*18. Apparatus as claimed in claim 17, in which said inlets are in the form of slots formed in said conical surfaces.*

*19. Apparatus for ejecting a mixture of a plurality of liquids, comprising a mixing chamber having an outlet opening and a plurality of spaced inlets which are spaced different distances from said outlet opening, means for separately introducing different liquids into the chamber through said inlets, a plunger reciprocable in the chamber between forward and rear positions, the differently spaced inlets communicating with the chamber and with each other in said rear position of the plunger, and means sealing against the plunger in the forward position of the plunger to seal said inlets from each other, said sealing means comprising an annular throat in which said plunger reciprocates, said plunger being in sealing contact with said throat in said forward position and exposing all said inlets to each other in said rear position, said forward end of said*

*plunger being disposed on opposite sides of said throat in said forward and rear positions, said inlets being disposed on opposite sides of said throat and being defined between said throat and the ends of separable members that abut said throat on opposite sides of said throat, said throat closing one side of each of said inlets, said separable member on the same side of said throat as said outlet opening being carried by a packing sleeve of elastic deformable material through which said plunger extends in said forward position.*

*20. Apparatus as claimed in claim 19, said inlets nearest said outlet opening being inclined rearwardly and the surface of said separable member on the same side of said throat as said outlet opening being conical and being in contact with a conical surface of said throat.*

*21. Apparatus as claimed in claim 20, in which the inside diameter of said separable member on the same side of said throat as said outlet opening is greater than the inside diameter of said throat.*

*22. Apparatus for ejecting a mixture of a plurality of liquids, comprising a mixing chamber having an outlet opening and a plurality of spaced inlets which are spaced different distances from said outlet opening, means for separately introducing different liquids into the chamber through said inlets, a plunger reciprocable in the chamber between forward and rear positions, the differently spaced inlets communicating with the chamber and with each other in said rear position of the plunger, and means sealing against the plunger in the forward position of the plunger to seal said inlets from each other, said sealing means comprising an annular throat in which said plunger reciprocates, said plunger being in sealing contact with said throat in said forward position and exposing all said inlets to each other in said rear position, said forward end of said plunger being disposed on opposite sides of said throat in said forward and rear positions, said inlets being disposed on opposite sides of said throat, the surface of said plunger in and adjacent said throat being an elastic deformable material, the inside diameter of said throat being less than the normal outer diameter of said surface of elastic deformable material.*

*23. Apparatus as claimed in claim 22, said plunger adjacent said throat comprising a sleeve of said elastic deformable material on a rod, said rod having grooves on its outer surface which are only partially filled by the material of said sleeve.*

* * * * *